(12) United States Patent
Teveris (10) Patent No.: US 9,661,885 B2
(45) Date of Patent: May 30, 2017

(54) COLOR MANAGEMENT FOR FABRICATION SYSTEMS

(71) Applicant: GERBER TECHNOLOGY, INC., Tolland, CT (US)

(72) Inventor: Harold A. Teveris, Tolland, CT (US)

(73) Assignee: GERBER TECHNOLOGY LLC, Tolland, CT (US)

( * ) Notice: Subject to any disclaimer, the term of this patent is extended or adjusted under 35 U.S.C. 154(b) by 0 days.

(21) Appl. No.: 14/920,496

(22) Filed: Oct. 22, 2015

(65) Prior Publication Data

US 2017/0112216 A1    Apr. 27, 2017

(51) Int. Cl.
*G06F 19/00*    (2011.01)
*A41H 3/00*     (2006.01)
*G05B 15/02*    (2006.01)
*A41H 43/00*    (2006.01)

(52) U.S. Cl.
CPC ............ *A41H 3/007* (2013.01); *A41H 43/00* (2013.01); *G05B 15/02* (2013.01)

(58) Field of Classification Search
CPC ........... A41H 3/007; A41H 3/08; G05B 15/02
USPC .................................................. 700/131–133
See application file for complete search history.

(56) References Cited

U.S. PATENT DOCUMENTS

| | | | | |
|---|---|---|---|---|
| 4,575,628 A * | 3/1986 | Bankart | .................... | G06K 1/10 250/235 |
| 4,780,960 A * | 11/1988 | Merz | ........................ | A41H 3/00 33/12 |
| 5,530,652 A * | 6/1996 | Croyle | ..................... | A41H 1/02 356/394 |
| 7,031,527 B2 * | 4/2006 | Ishikawa | .................. | G06K 9/48 345/582 |
| 7,426,302 B2 * | 9/2008 | Amico | .................... | G06K 9/481 356/429 |
| 8,364,561 B2 * | 1/2013 | Wolper | ................... | G06T 17/00 700/132 |
| 2002/0002416 A1 * | 1/2002 | Herman, Jr. | ............. | B26D 5/00 700/135 |
| 2003/0139840 A1 * | 7/2003 | Magee | ............... | D06B 11/0059 700/133 |
| 2006/0171592 A1 * | 8/2006 | Amico | ................... | G06K 9/481 382/203 |
| 2009/0169113 A1 * | 7/2009 | Geiger | ............... | G06K 9/00476 382/203 |
| 2010/0174400 A1 * | 7/2010 | Lai | ........................ | A41H 3/007 700/132 |

* cited by examiner

*Primary Examiner* — Nathan Durham
(74) *Attorney, Agent, or Firm* — Day Pitney LLP (57) ABSTRACT

A computer program product including machine executable instructions stored on machine readable media for implementing a method for controlling color reproduction during manufacture of fabric for a garment is provided. The method includes: obtaining appearance information descriptive of the appearance desired for the fabric; obtaining color profile information for a device that generated the appearance information; updating the appearance information with the color profile information; selecting parts information descriptive of the geometry of at least one part of the garment and applying the updated appearance information to provide updated parts information; and storing the updated parts information for reference during the manufacture. A system and a method are described.

20 Claims, 6 Drawing Sheets

COLOR MANAGEMENT FOR FABRICATION SYSTEMS

BACKGROUND OF THE INVENTION

1. Field of the Invention

This disclosure relates to fabrication systems, and in particular, to color management for printing operations for sheet material such as that used in the fabrication of garments.

2. Description of Related Art

Mass production of apparel is increasingly automated. For example, a variety of software tools are available to assist with design and production. One type of software that provides great flexibility is that of pattern management software. Current pattern management software provides users with the capability to layout and adjust the various parts that become a garment once all are sewn together.

The currently available pattern management software has a variety of limitations. For example, parts of a garment are shown only by the outline of their respective shapes. In some instances, this is workable. However, as manufacture nears production, this is problematic.

Consider production of apparel that includes heavily patterned material, such as striped or plaid material. Throughout the entire process, the fabric "pattern" has never come into play. There are third party applications that take the outline of each piece of a pattern that is exported from the pattern management software, and permit users to then fill the outline with patterns and colors. While this can help designers with visualizing a product, this approach does not provide a needed level of manufacturing control.

Consider, for example, that color is important to a designer. Moving the images between applications tends to exacerbate any inaccuracies in color. Accordingly, initial production may require careful inspections of an initial production, process adjustment and repetition. This is not without cost and lost production time. If adjustments are required, this process can be quite expensive.

What are needed are techniques for improving color management in the manufacture of fabrics, in particular for the manufacture of printed fabric used to assemble garments. Preferably, the techniques facilitate the design process.

SUMMARY OF THE INVENTION

In one embodiment, a computer program product including machine executable instructions stored on machine readable media for implementing a method for controlling color reproduction during manufacture of fabric for a garment is provided. The method includes: obtaining appearance information descriptive of the appearance desired for the fabric; obtaining color profile information for a device that generated the appearance information; updating the appearance information with the color profile information; selecting parts information descriptive of the geometry of at least one part of the garment and applying the updated appearance information to provide updated parts information; and storing the updated parts information for reference during the manufacture.

The appearance information may be at least one of a result of imaging and generated by software. The color profile information may include at least one of illumination information and color sensitivity of the device that generated the appearance information. The device that generated the appearance information may include at least one of a charge coupled device (CCD) and a complimentary metal oxide sensor (CMOS). At least a portion of the appearance information may be scalable with changes to the geometry of the parts information. The appearance information may be provided in at least one layer. The color profile information may be derived from a color model selected from the group consisting of CIE, RGB, YUV, HSL/HSV and CMYK.

In another embodiment, a system for managing color of fabric used to assemble a garment is provided. The system includes: a platform including a pattern management tool configured for obtaining appearance information descriptive of the appearance desired for the fabric; obtaining color profile information for a device that generated the appearance information; updating the appearance information with the color profile information; selecting parts information descriptive of the geometry of at least one part of the garment and applying the updated appearance information to provide updated parts information; and storing the updated parts information for reference during the manufacture.

The platform may include one of a personal computer and a tablet computer. The platform management tool may be in communication with the device that generated the appearance information. The platform management tool may at least one of store the color profile information and be configured to obtain the color profile information from the device that generated the appearance information. The platform management tool may be further in communication with at least one of a printer and a cutting machine. The platform management tool may be configured to obtain color profile information of the printer. The platform management tool may be configured to provide conversion of color profile information for the device to the color profile of the printer. The platform management tool may include at least one of a color space data table and a color space algorithm to provide the conversion.

In another embodiment, a method for controlling color reproduction during manufacture of fabric for a garment is provided. The method includes: obtaining appearance information descriptive of the appearance desired for the fabric; obtaining color profile information for a device that generated the appearance information; updating the appearance information with the color profile information; selecting parts information descriptive of the geometry of at least one part of the garment and applying the updated appearance information to provide updated parts information; and storing the updated parts information for reference during the manufacture.

BRIEF DESCRIPTION OF THE DRAWINGS

The features and advantages of the invention are apparent from the following description taken in conjunction with the accompanying drawings in which.

DETAILED DESCRIPTION OF THE INVENTION

Disclosed herein are methods and apparatus for color management of printing processes for fabrics. In particular, the fabrics are used for providing pieces or parts of patterns that are used to assemble garments. The methods and apparatus provide improvements in software used for garment design and result in reduced cost of manufacture.

In order to provide some context, some terminology is now introduced.

As discussed herein, the term "color space" generally refers to any one of a number of models or standards for defining color. Generally, there are five major models, that sub-divide into others, which are: CIE, RGB, YUV, HSL/HSV, and CMYK. CIE, which may also be referred to as "CIE 1931 XYZ" was the first attempt to produce a color space based on measurements of human color perception and is the basis for almost all other color spaces. CIE may be provided in various modified forms. One example is CIELAB. CIELAB (or L*a*b* or Lab) was designed to produce a color space that is more perceptually linear than other color spaces. RGB (Red, Green, Blue) describes what kind of light needs to be emitted to produce a given color. Light is added together to create form from darkness. RGB stores individual values for red, green and blue. RGB is not a color space, it is a color model. There are many different RGB color spaces derived from this color model. YUV, YIQ, YDbDr and related models provide for measures of luma plus chroma/chrominance. YIQ was formerly used in NTSC (North America, Japan and elsewhere) television broadcasts for historical reasons. This system stores a luma value with two chroma or chrominance values, corresponding approximately to the amounts of blue and red in the color. It corresponds closely to the YUV scheme used in PAL (Australia, Europe, except France, which uses SECAM) television except that the YIQ color space is rotated 33 degrees with respect to the YUV color space. The YDbDr scheme used by SECAM television is rotated in another way. HSL/HSV provide for measures of hue and saturation. HSV (hue, saturation, value), also known as HSB (hue, saturation, brightness), is often used by artists because it is often more natural to think about a color in terms of hue and saturation than in terms of additive or subtractive color components. HSV is a transformation of an RGB color space, and its components and colorimetry are relative to the RGB color space from which it was derived. HSL (hue, saturation, lightness/luminance), also known as HSL, HSI (hue, saturation, intensity) or HSD (hue, saturation, darkness), is quite similar to HSV, with "lightness" replacing "brightness." The difference is that the brightness of a pure color is equal to the brightness of white, while the lightness of a pure color is equal to the lightness of a medium gray. CMYK is used in the printing process, because it describes what kind of inks need to be applied so the light reflected from the substrate and through the inks produces a given color. One starts with a white substrate (canvas, page, etc.), and uses ink to subtract color from white to create an image. CMYK stores ink values for cyan, magenta, yellow and black. There are many CMYK color spaces for different sets of inks, substrates, and press characteristics (which change the dot gain or transfer function for each ink and thus change the appearance). A variety of other color space models are known.

As discussed herein, the term "color profile," "ICC profile," "device profile" and other similar terms generally refer to a set of data that characterizes the color response of a color input or output device. In some embodiments, the color profile is defined by standards promulgated by the International Color Consortium (ICC). Profiles describe the color attributes of a particular device or viewing requirement by defining a mapping between the device source or target color space and a profile connection space (PCS). In some embodiments, the PCS is one of CIELAB (L*a*b*) or CIEXYZ. Mappings may be specified using tables, to which interpolation may be applied, or through a series of algorithms for transformations.

Every device that captures or displays color may be profiled. Some manufacturers provide color profiles for their products. There are also several products that allow an end-user to generate a color profile for a device. Generation of a color profile may be completed through use of a tristimulus colorimeter or a spectrophotometer.

As discussed herein, the term "color space conversion" generally refers to translation of the representation of a color from one color space to another. This typically occurs in the context of converting an image that is represented in one color space to another color space, the goal being to make the translated image look as similar color-wise as possible to the original.

As an example of color conversion, consider being provided with data associated with a particular RGB color space, and that it is necessary to convert from the particular RGB color space to a CMYK color space. The first step is to obtain an ICC profile for the input device, and another ICC profile for the output device. To perform the conversion, each RGB triplet is first converted to a profile connection space (PCS) dataset using the RGB profile. If necessary, the PCS dataset is converted to an intermediate space, such as between CIELAB and CIEXYZ which provide well-defined transformation systems. The PCS dataset is then converted to the four values of CMYK using the second profile (i.e., the ICC profile of the output device).

Thus, a profile provides a mapping from one color space and enables conversion to another color space. Conversion might involve use of tables of color values, some of which may have to be interpolated (separate tables will be needed for the conversion in each direction), or by use of a series of mathematical formulae.

As discussed herein, the term "pattern," is generally used in two different contexts. In the first context, the term "pattern" generally refers to the geometry of a layout or description for a plurality of pieces (also referred to as "parts") of material that are used to assemble a garment. In this context, the pattern describes the shape and size of each part of the garment, as well as the relationships for assembly of the parts. In order to avoid confusion, in some instances, for this first context, a "part" or a "piece" of a pattern as appropriate is described. In the second context, the term "pattern" generally describes an appearance. For example, a repeating series of flowers may describe a floral pattern, and that floral pattern may be used as a print on a material. In this context, the pattern may be applied to blank fabric, or fabric that already includes a base pattern or color. In order to avoid confusion, in some instances, this second context may be referred to as an "appearance pattern."

Thus, a part (or a piece) of a pattern may exhibit an appearance pattern. Accordingly, a plurality of parts may be assembled into a garment that exhibits a particular appearance. The term "appearance pattern color profile" is therefore a shortened expression that generally refers to the look or appearance of a pattern that may be used on a fabric, and further includes color profile information.

Generally, sheet material (such as a roll of fabric) is broken down into a plurality of different parts. The parts represent portions of a given pattern, which are then used to assemble a garment. Assembly of the parts used to provide the garment may be performed by a seamstress, for example. Generally, the parts or pieces of material are cut from a larger supply of material (such as a roll of fabric). The cutting process may involve conventional fabric cutting equipment and/or other techniques as deemed appropriate. The techniques disclosed herein are not limited to pieces of particular shapes or sizes.

In exemplary embodiments, the sheet material may include a roll of fabric such as web material (i.e., a woven material). The appearance of the fabric may be entirely blank, contain multiple colors and/or patterns disposed thereon. Any patterns that are included may be repeating, appear random, and may convey any information deemed appropriate. For example, the fabric may include imagery, text, graphics, and other design(s). As provided herein, the raw materials may be adorned with coloring, which may take the form of patterns, including logos, branding information and other such coloration.

Figure 1:
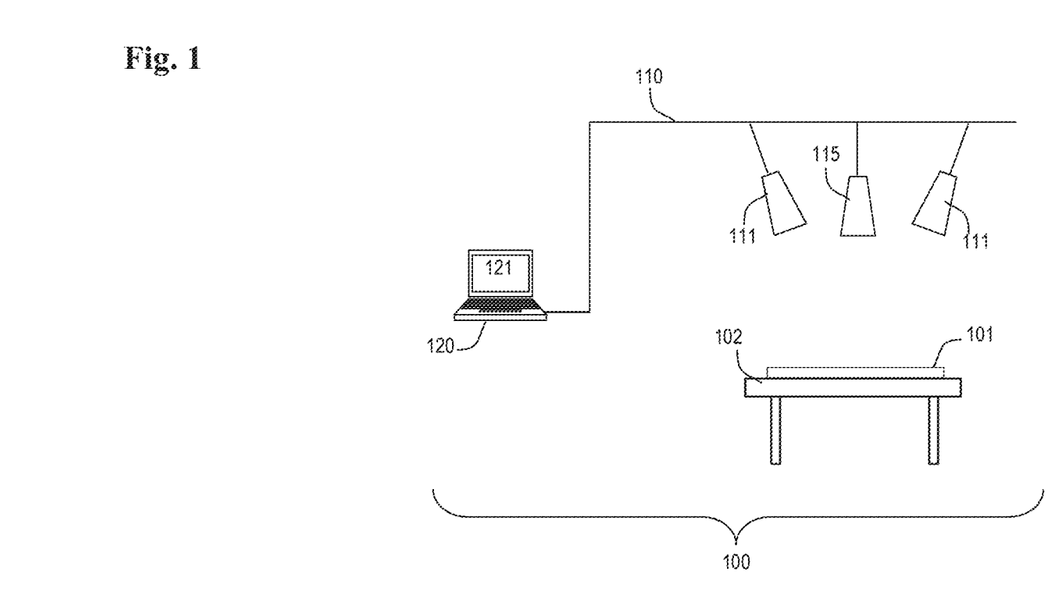
FIG. 1 is a schematic diagram of aspects of an imaging system.

Referring now to FIG. 1, an exemplary embodiment of an imaging system 100 is shown. In this exemplary embodiment, the imaging system 100 generally includes imaging equipment, a sample area and a control system. The imaging system 100 is used to provide an appearance pattern.

In the exemplary embodiment, the sample area includes a table 102 upon which a portion of a material or "swatch 101" is disposed. Generally, the swatch 101 includes a substantially flat and smooth thickness of material. In the exemplary embodiments, the swatch 101 includes a complex pattern, such as a floral pattern containing a variety of colors and irregular or odd shapes. The swatch 101 may include any type of appearance pattern deemed appropriate and that a user wishes to reproduce on another device such as a printer for printing on fabric (see FIG. 5).

The imaging equipment may include illumination 111 and an imaging device 115. The illumination 111 may include any form of lighting system deemed appropriate. For example, illumination 111 may include at least one spotlight, track lighting, fluorescent lighting, and other such forms of illumination. Wavelengths generated by the illumination 111 may be particularly suited or chosen with regards to color space planning. The imaging device 115 may include at least one camera (such as a camera with a charge coupled device (CCD) or complimentary metal oxide sensor (CMOS) that includes a two-dimensional array of pixels). Other components as deemed appropriate for the imaging equipment may be included. For example, the imaging equipment may include guidance, such as provided by a laser to mark the perimeter of the imaging area. In some embodiments, the imaging area is simply laid out on the table 102.

The control system may include a computer 120. Generally, the computer 120 includes a user interface 121. The computer 120 is in communication with the imaging equipment. For example, the computer 120 may be connected to the imaging equipment by a network 110. The computer 120 may be in communication with other equipment, such as a remote computer (not shown). The computer 120 may be a dedicated or specialized system provided solely for imaging of the swatch 101. In some embodiments, the computer 120 is a multipurpose machine.

Generally, the control system (in this example, the computer 120) may include one or more central processing units (processors) capable of reading machine readable media and executing machine executable instructions.

The user interface 121 may be configured with various components such as a display equipped with a robust graphics adapter to improve the performance of graphics intensive applications, a video controller, a capacitive (i.e., touch screen) display, and the like. The user interface may include a keyboard, a pointing device (e.g., a mouse), a microphone and a speaker. Other user interface components may be included as deemed appropriate.

The control system may include a variety of additional computing resources as are known in the art. This includes data storage, graphics equipment (such as draw pads, touch-pads, additional imaging devices, touch screens, and other such devices), additional network connections, and may further include output devices such as at least one local printer (including color printers), a network printer, and/or another specialized device.

Generally, the control system includes machine readable instructions stored on machine readable media (such as in ROM, RAM, or in a mass storage unit). Machine readable media may be referred to as "non-transitory" media. The machine readable instructions (referred to herein as "software," as an "application," as a "client, a "process," a "plug-in" and by other similar terms) generally provide for functionality as generally set forth herein.

Data may be stored in any type of database deemed appropriate, and manipulated with appropriate tools. For example, images, as well as the shapes and inventory thereof may be stored in databases such as ORACLE provided by Oracle Corporation, of Redwood Shores, Calif.; SQL SERVER from Microsoft Corporation of Redmond, Wash.; and SYBASE of SAP Corporation of Dublin, Calif. Data libraries as may be generated may be managed using these or other tools.

Some of the software (i.e., the machine readable instructions on machine readable media) included with the control system may include an operating environment. For example, and as presented herein, a suitable operating environment is WINDOWS (available from Microsoft Corporation of Redmond Wash.). Software as provided herein may be developed in, for example, SQL language, which is a cross-vendor query language for managing relational databases. Aspects of the software may be implemented with other software. For example, user interfaces may be provided in XML, HTML and the like.

Third party software may be used with the imaging system 100. For example, software for controlling of illumination 111 as well as the imaging device 115 may be used. Some third party software may be integrated with the control system such that seamless operation is provided to the user. Accordingly, the control system may have at least one interface for interfacing with ancillary software or systems.

In one embodiment, an appearance pattern (i.e., imagery present on the swatch 101) is imaged with the imaging system 100. Subsequently, the control system or another system (such as a remote computer) obtains information such as color characteristics of the imaging device 115 as well as characteristics of the illumination 111 to provide a color profile for the appearance pattern. The resulting appearance pattern color profile is stored electronically and may be stored on non-transitory media.

In another embodiment, an appearance pattern is software generated on a computer, such as computer 120. The computer 120 may be equipped with graphics software such as an illustrator or drawing package. Accordingly, the user will create the appearance pattern within the graphics software, using available tools that are provided in the graphics software. An example of suitable graphics software is ADOBE ILLUSTRATOR, available from Adobe Systems Incorporated of San Jose, Calif. The computer 120 may then collect information such as color characteristics of the graphic display to provide a color profile for the appearance pattern. The resulting appearance pattern color profile is stored electronically and may be stored on non-transitory media.

Generally, the appearance pattern color profile includes appearance information such as the colors and patterns in the swatch 101 (whether imaged or software generated) along with equipment characteristics. That is, the appearance pattern color profile may embed color space information related to the tools used to generate the appearance pattern color profile. For example, the appearance pattern color profile may include information related to the wavelengths of illumination used during imaging, color sensitivity characteristics for the sensor used for imaging, along with imaging data. As another example, the appearance pattern color profile may include color production information for a monitor (to address visual biases presented to a graphic artist) as well as the graphics data produced by the graphics software.

In some embodiments, the user interface 121 provides users with a graphical user interface that permits the user to interface with pattern management software. An exemplary interface and aspects of the pattern management software are provided in FIGS. 2-5.

Figure 2:
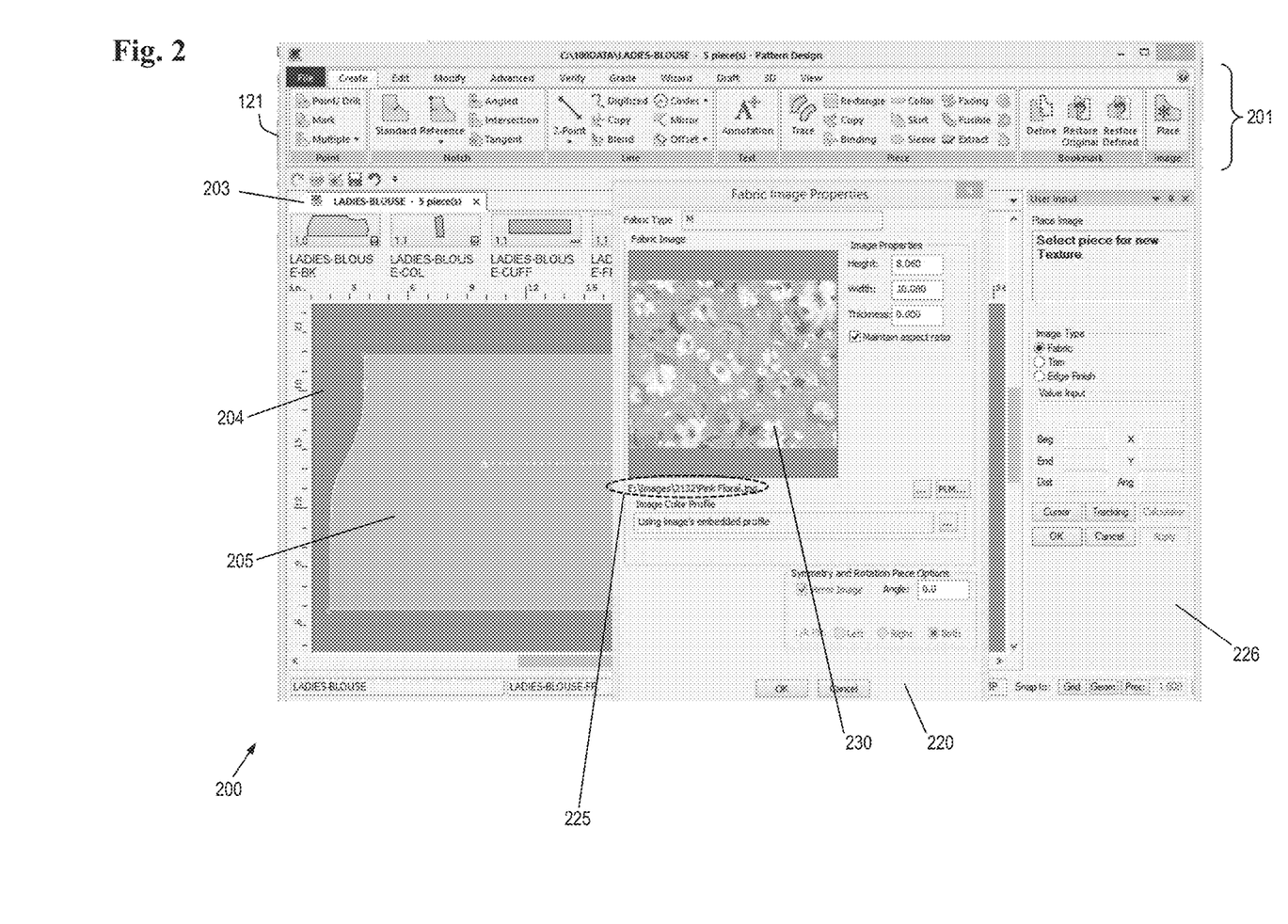
FIGS. 2, 3 and 4 are examples of a user interface for providing color profile management.
Figure 3:
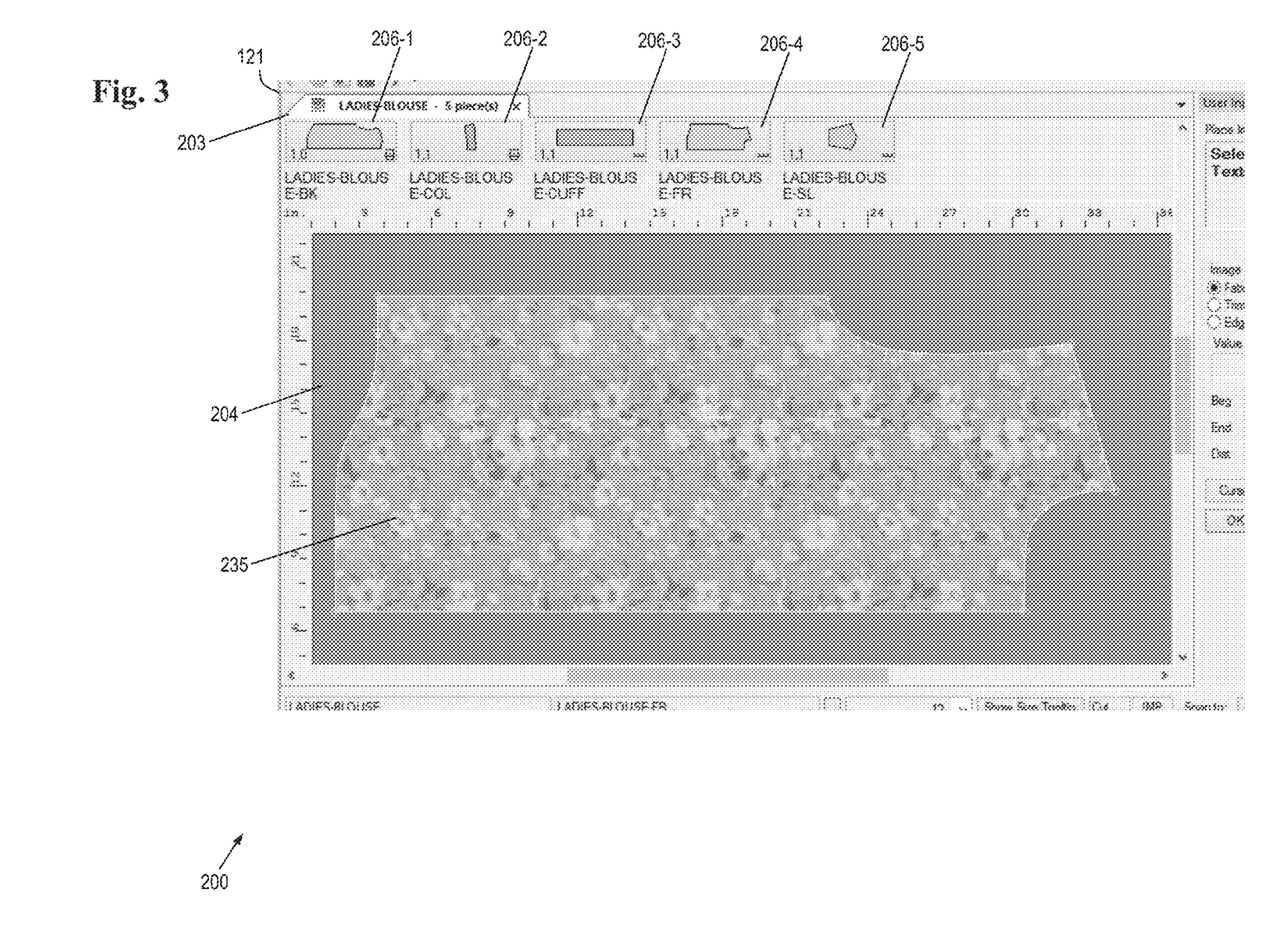
Figure 4:
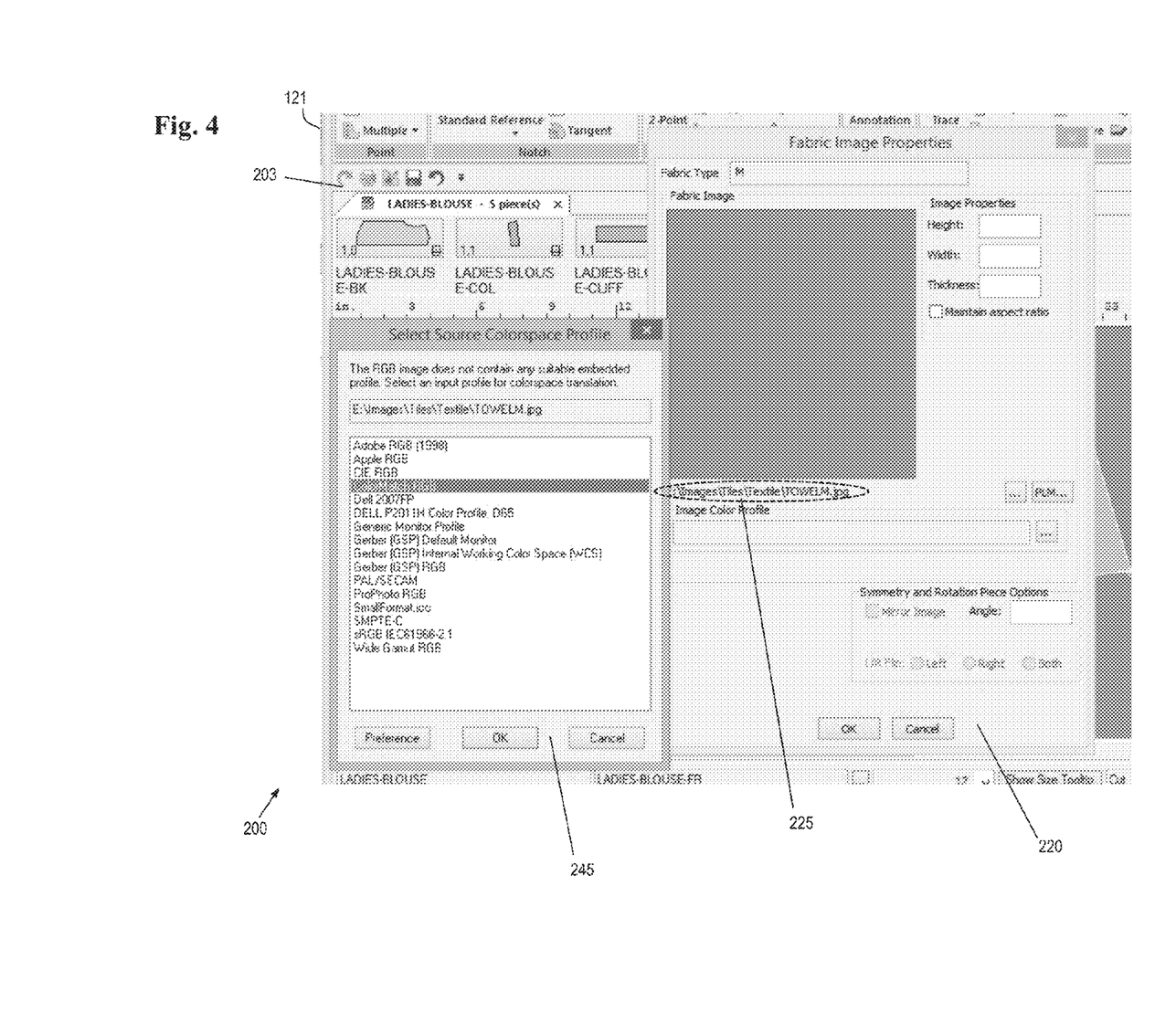

Referring now to FIGS. 2-4 user interface 121 depicts aspects of an embodiment of the pattern management software 200. Generally, the pattern management software 200 includes a toolbar 201. Toolbar 201 provides access to a substantial number of software tools. The software tools provide for file management as well as modification of file data. Using the software tools, the user may open a parts file that describes a particular part for a shape pattern. Each parts file may be opened under a parts tab 203. In some embodiments, a plurality of parts are contained within a single parts file. For example, all of the parts for a particular shape pattern may be contained within a single parts file. In the example shown, the parts file is for a portion of a ladies blouse.

As may be seen under the parts tab 203, a display area 204 graphically depicts an outline 205 of a given part. The outline 205 includes a shape that is associated with each particular part used to assemble the garment. The pattern management software 200 provides a separate fabric image properties interface 220. In this example, the fabric image properties interface 220 is a pop-up window. Generally, the fabric image properties interface 220 provides for retrieving the previously created appearance pattern color profile 225. The fabric image properties interface 220 may provide a display of the appearance pattern 230 and may include additional tools for managing image properties, as well as color profiles, orientation with regards to the parts used to assemble the garment as well as additional aspects. Additionally, a user controls interface 226 may provide for manipulation of the appearance pattern 230. The user controls interface 226 may be separated from the fabric image properties interface 220 to provide for global application (such as across all open parts tabs 203), establish default values, and to apply other techniques.

Refer now also to FIG. 3, where the appearance pattern 230 has been applied to the outline 205 (shown in FIG. 2). Once the appearance pattern 230 has been applied to the outline 205, the resulting appearance part 235 may be stored as an updated parts file. In this illustration, the user has selected appropriate image properties for the fabric and closed the fabric image properties interface 220. Additionally, the user has applied the appropriate user controls and closed the user controls interface 226.

In this illustration, it may be seen that the parts tab 203 includes a series of parts icons 206-X. Each of the parts icons correlates to a specific part for the garment, in this case a ladies blouse. For example, a back of the ladies blouse is depicted in parts icon 206-1. A collar of the ladies blouse is depicted in parts icon 206-2. A cuff for the ladies blouse is depicted in parts icon 206-3. A front of the ladies blouse is depicted in parts icon 206-4. A sleeve of the ladies blouse is depicted in parts icon 206-5. Generally, a user need only to point and click on one of the parts icons 206-X to select the associated part of the garment. Accordingly, the process described in relation to FIG. 2 may be easily repeated for the entire garment. Additionally, by virtue of the user controls interface 226 some properties may be applied globally to each of the parts and the specific parts file.

Referring now also to FIG. 4, the user has opted to select color space information for the input device. The color space selection menu 245 may be particularly useful where an electronic file containing the appearance pattern has been provided by an external source, and there is no embedded color space information. Accordingly, the color space selection menu 245 permits the user to manually apply color space information or to override existing color space information for a given input device.

In some embodiments, the pattern management software 200 permits users to manipulate the appearance pattern 230 in relation to the outline 205. For example, the user may adjust orientation of the appearance pattern 230 on a first part as well as a second part, such that when the first part and the second part are joined together, the appearance pattern 230 appears continuous and uninterrupted by a resulting seam between the parts.

In some embodiments, the appearance pattern 230 is scalable. That is, the appearance pattern 230 may be scaled as the size and/or shape of the outline 205 are adjusted. In one embodiment, the appearance pattern 230 is stored as a scalable vector graphics (SVG) file. SVG is a markup language for describing two-dimensional graphics applications and images, and a set of related graphics script interfaces. Standards for SVG files are promulgated by the World Wide Web Consortium (W3C), which is an international community where member organizations, a full-time staff, and the public work together to develop web standards. In the United States, W3C is located in Cambridge, Mass.

With a scalable appearance pattern 230, users may adjust sizing of the pattern and thus maintain the intended proportionality of the designer. For example, the size of a logo may be increased slightly for a garment that is one size larger, and in proportion with, for example, the size of a pocket upon which the logo is disposed.

In some embodiments, portions of the appearance information are scalable while other portions remain static. For example, consider the foregoing logo displayed over the plaid pattern. While the user may desire the size of the logo to be adjusted along with changes to the size of the outline 205, the user may also wish that the geometry of the plaid pattern remain constant. Accordingly, in some embodiments, the appearance pattern 230 may include layers such as are provided in a CAD program. Thus, properties of one layer may be adjusted well properties of another layer remain constant.

Figure 5:
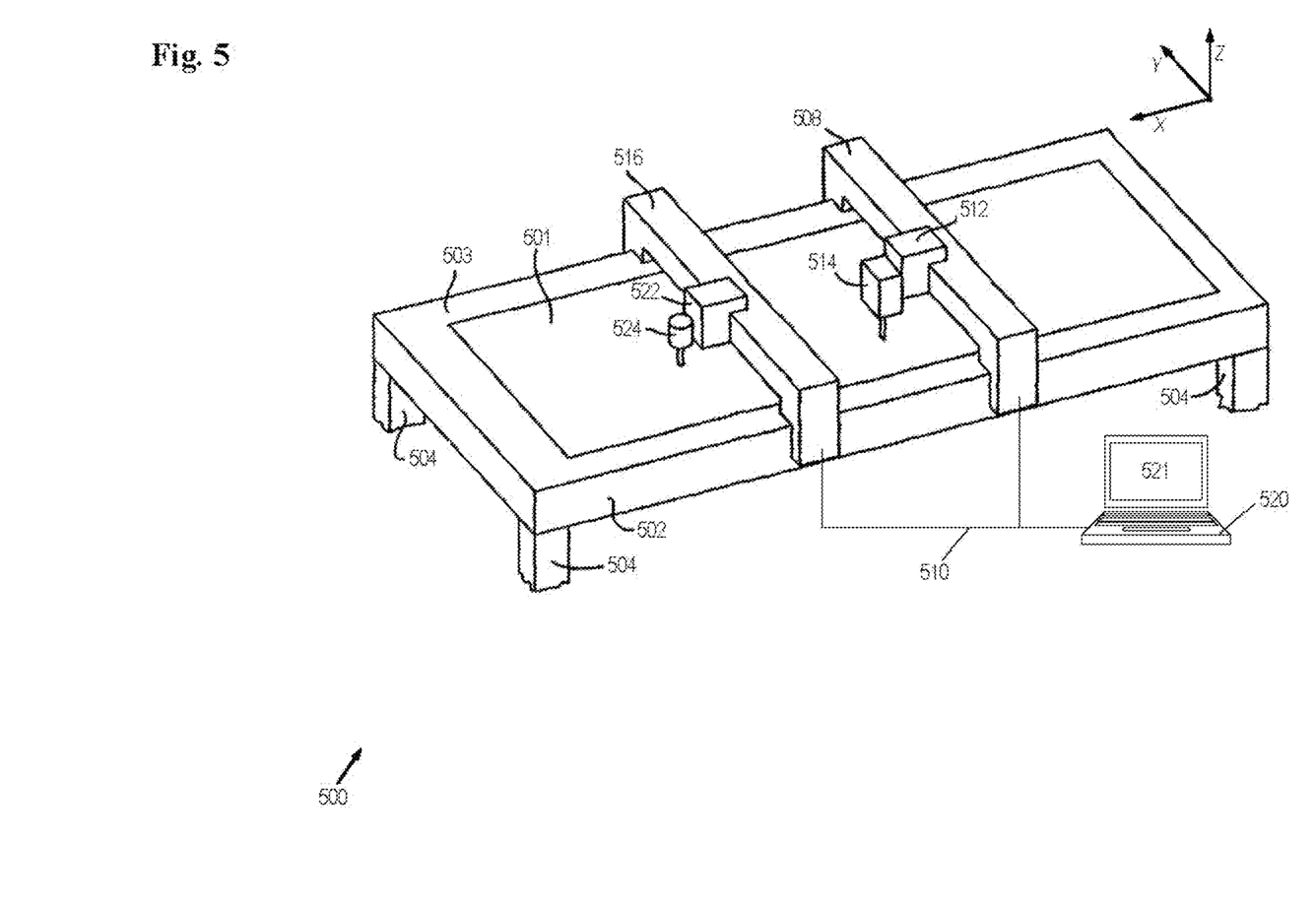
FIG. 5 is a perspective diagram of aspects of a printing system.

Referring now to FIG. 5, a fabric printing and cutting apparatus, which is referred to generally with the reference character 500, is shown having a table 502 supported on legs 504. The table 502 includes a flat upper work surface 503 adapted to support a sample or swatch 501. A first carriage 508, which transversely spans the table 502, is supported for movement in a first coordinate direction X and movably carries thereon a cutter carriage 512 mounted for movement in a second coordinate direction Y. The cutter carriage 512 includes a cutter head 514 mounted thereon. Various cutting devices, including rotating blades, reciprocating blades, lasers, or water jets may be employed in the cutter head 514 as deemed appropriate.

A second carriage 516, also transversely spans the table 502 and is supported for longitudinal movement, similar to the first carriage 508. The second carriage 516 movably carries thereon a printer carriage 522 mounted for movement in the Y direction. The printer carriage 522 includes a print head 524 mounted thereon. In one embodiment, the print head 524 that employs a pigment jet printer, such as, but not limited to a dye-jet or ink-jet, although other types of printer, such as thermal transfer printers may be used. The printing and cutting apparatus 500 includes a controller 520 which sends and receives signals on network 510 and processes those signals. The controller 520 may include a user interface 521 that includes a video display, a keyboard, a pointing device and other interface components. The controller 520 may include a computer processor that includes memory, other peripheral hardware to perform the functions set forth herein above, and may further be equipped with software to control, for example, communications, operation of the fabric printing and cutting apparatus 500 and provide the user interface 521.

Accordingly, a user may collect color space profile for a swatch 101 or a graphics file and through the pattern management software 200, provide for accurate color-wise reproduction of the swatch 101 on a fabric.

In some embodiments, the pattern management software 200 is configured to generate appearance pattern color profiles 225. In some embodiments, the pattern management software 200 is configured to apply the appearance pattern 230 (with or without an color space profile for an input device) to the outline 205, generate the appearance part 235, and to update and store the parts file.

Generally, the pattern management software 200 operates on a platform such as one of a personal computer (PC), such as one implementing an operating system from Microsoft Corp. of Redmond, Wash., or Apple Inc., of Cupertino, Calif., or another system such as LINUX or UNIX. Other equipment may be used. For example, the platform may be provided as a tablet computer such as an IPAD from Apple Inc.

Figure 6:
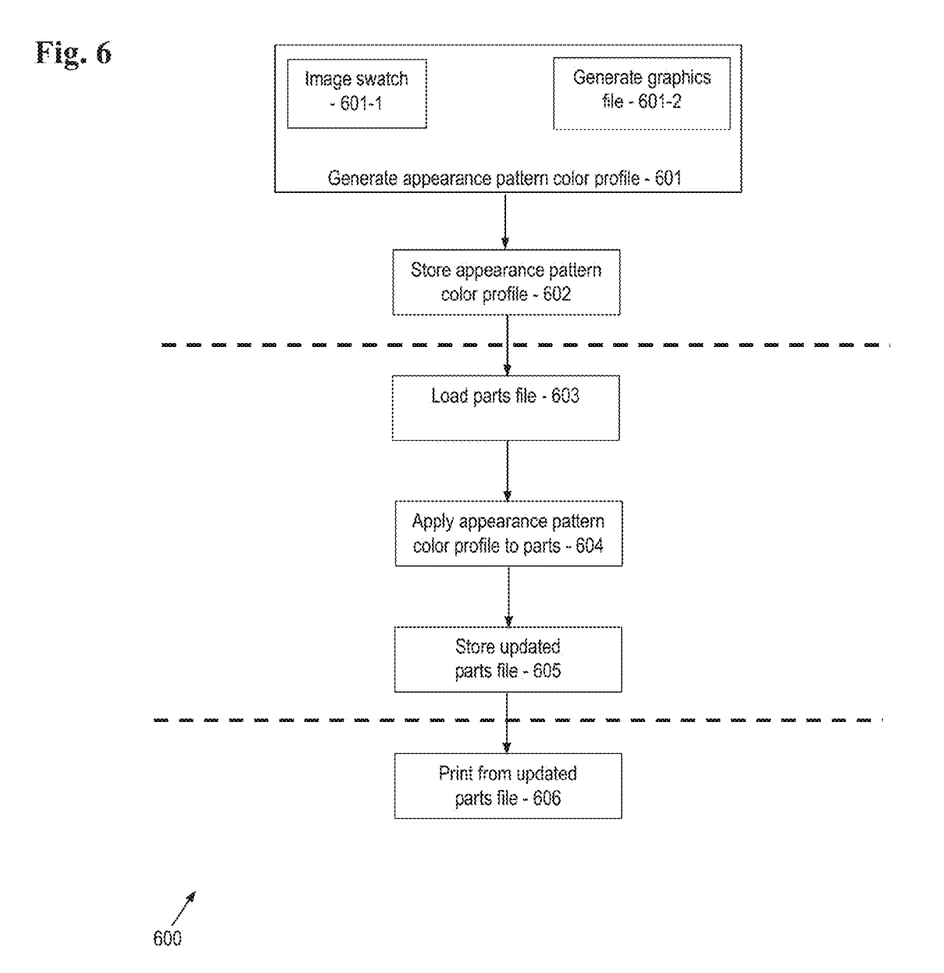
FIG. 6 is a flow chart depicting an exemplary method for performing color profile management.

Referring to FIG. 6, a flow chart depicting an exemplary method for color profile management is shown. In the exemplary method for color profile management 600, a first step 601 includes generating the appearance pattern color profile. The appearance pattern color profile may be generated by imaging of a swatch 601-1 and/or by generating a graphics file 601-2. That is, in some embodiments, a user may wish to update the appearance pattern color profile generated by an imaging system by additional manipulation with graphics software. Once generated, the appearance pattern color profile is stored in a second step 602.

In some embodiments, the exemplary method for color profile management 600 is then terminated. In some other embodiments, the exemplary method for color profile management 600 continues with a third step 603.

In the third step 603, the user loads a parts file. The parts file may be predefined or generated contemporaneously by the user. In a fourth step 604, the user applies the appearance pattern color profile to the parts within the parts file, thus generating "appearance parts" (i.e., outlines of parts that have been filled in with the appearance pattern). In a fifth step 605, the user stores the updated parts files.

In some embodiments, the exemplary method for color profile management 600 is then terminated. In some other embodiments, the exemplary method for color profile management 600 continues with a sixth step 606.

In the sixth step 606, the user sends the updated parts file(s) to the fabric printing and cutting apparatus for printing.

Having thus introduced aspects of color space profiles and color space management for fabric production, some additional embodiments and features are now introduced.

In some additional embodiments, the pattern management software 200 is configured to retrieve updated parts files that describe appearance parts 235 and then to send the updated parts files to the fabric printing and cutting apparatus 500. Further, in some of these embodiments, the pattern management software 200 is configured to monitor production of the fabric printing and cutting apparatus 500 and to ensure color quality. More specifically, the pattern management software 200 may be configured to provide color conversion between the appearance pattern color profile 225 according to a color profile for the fabric printing and cutting apparatus 500. In some embodiments, the pattern management software 200 may be configured to monitor production by the fabric printing and cutting apparatus 500 and ensure that production meets quality criteria. More specifically, and by way of example, the fabric printing and cutting apparatus 500 may include a sensor (not shown) that is provided to monitor color of the final product. Changes in the color of the final product may be detected by the sensor and recognized by the controller 520. The controller 520 may then adjust printing apparatus such as print head 524 to provide appropriate adjustments in color output.

Other embodiments of the imaging system 100 may be used. For example, the imaging system 100 may include a scanner (not shown). The scanner may be any type of scanner including hand-held, flatbed, or of another geometry. The scanner may include whatever processing capabilities are deemed appropriate. For example, the scanner may be 32 bit, 64 bit, or higher. The imaging system 100 may include a camera, such as a hand-held camera, and used to take images in the field using sunlight, incandescent, fluorescent, or another type of lighting, or generally unknown lighting conditions.

In some embodiments, such as where a camera is used, the appearance pattern may be collected in a variety of settings. For example, in some embodiments, the appearance pattern may be collected by taking a picture of flowers in a garden. Subsequently, the user may manipulate the picture of the flowers in the garden to, for example, soften the image. Thus, the picture may be manipulated so as to be better suited for fabrication processes. Any subject deemed appropriate may be imaged for providing the appearance pattern.

In some embodiments, the pattern management software tool may be further configured to operate with or contain the functionality of software governing the fabric printing and cutting apparatus. For example, the pattern management software tool may further provide for nesting of parts outlines in preparation for fabric printing and cutting. In this context, "nesting" generally refers to an overall layout where a plurality of parts outlines are placed onto the fabric such that waste of fabric material is minimized.

A variety of embodiments of the fabric printing and cutting apparatus may be realized. It is not necessary that fabric printing and cutting occur on the same device, or at the same time. Fabric printing is not limited to printing on parts, and may include printing substantially across a width of material (such as across a role of material).

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the disclosure hereof any element expressed as a means for performing a specified function is intended to encompass any way of performing that function including, for example, a) a combination of circuit elements and associated hardware which perform that function or b) software in any form, including, therefore, firmware, microcode or the like as set forth herein, combined with appropriate circuitry for executing that software to perform the function. Applicants thus regard any means which can provide those functionalities as equivalent to those shown herein.

Various other components may be included and called upon for providing for aspects of the teachings herein. For example, additional materials, combinations of materials and/or omission of materials may be used to provide for added embodiments that are within the scope of the teachings herein.

Terms of orientation such as "top" and "bottom" as may be used herein are merely for purposes of discussion and ease in referencing the various elements. Terms of orientation are not to be construed as limiting of the teachings in any way.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. The term "exemplary" is intended to signify one of many possible embodiments, an example of an embodiment. The term "exemplary" is not to be construed as an outstanding or superlative embodiment (which, in some instances, it may be, but this is not a requirement).

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A computer program product comprising non-transitory machine executable instructions stored on machine readable media for implementing a method for controlling color reproduction during manufacture of fabric for a garment, the method comprising:
   obtaining appearance information descriptive of the appearance desired for the fabric;
   obtaining color profile information for a device that generated the appearance information, the color profile information containing a set of data that characterizes the color response of the device and enables color conversion of the appearance information to another device;
   updating the appearance information with the color profile information;
   selecting parts information descriptive of the geometry of at least one part of the garment and applying the updated appearance information to provide updated parts information; and
   storing the updated parts information for reference during the manufacture.

2. The computer program product as in claim 1, wherein the appearance information is at least one of a result of imaging and generated by software.

3. The computer program product as in claim 1, wherein the color profile information comprises at least one of illumination information and color sensitivity of the device that generated the appearance information.

4. The computer program product as in claim 1, wherein the device that generated the appearance information comprises at least one of a charge coupled device (CCD) and a complimentary metal oxide sensor (CMOS).

5. The computer program product as in claim 1, wherein at least a portion of the appearance information is scalable with changes to the geometry of the parts information.

6. The computer program product as in claim 1, wherein the appearance information is provided in at least one layer.

7. The computer program product as in claim 1, wherein the color profile information is derived from a color model selected from the group consisting of CIE, RGB, YUV, HSL/HSV and CMYK.

8. The computer program product as in claim 1, further comprising storing the updated appearance information on non-transitory media.

9. The computer program product as in claim 1, further comprising:
   obtaining color profile information for an output device and adjusting color output of the output device to reproduce the desired appearance for the fabric.

10. A system for managing color of fabric used to assemble a garment, the system comprising:
    a platform comprising a pattern management tool configured for obtaining appearance information descriptive of the appearance desired for the fabric; obtaining color profile information for a device that generated the appearance information, the color profile information containing a set of data that characterizes the color response of the device and enables color conversion of the appearance information to another device; updating the appearance information with the color profile information; selecting parts information descriptive of the geometry of at least one part of the garment and applying the updated appearance information to provide updated parts information; and storing the updated parts information for reference during the manufacture.

11. The system as in claim 10, wherein the platform comprises one of a personal computer and a tablet computer.

12. The system as in claim 10, wherein the platform management tool is in communication with the device that generated the appearance information.

13. The system as in claim 10, wherein the platform management tool at least one of stores the color profile information and is configured to obtain the color profile information from the device that generated the appearance information.

14. The system as in claim 10, wherein the platform management tool is further in communication with at least one of a printer and a cutting machine.

15. The system as in claim 14, wherein the platform management tool is configured to obtain color profile information of the printer.

16. The system as in claim 14, wherein the platform management tool is configured to provide conversion of color profile information for the device to the color profile of the printer.

17. The system as in claim 16, wherein the platform management tool comprises at least one of a color space data table and a color space algorithm to provide the conversion.

18. A method for controlling color reproduction during manufacture of fabric for a garment, the method comprising:
    obtaining appearance information descriptive of the appearance desired for the fabric;
    obtaining color profile information for a device that generated the appearance information, the color profile information containing a set of data that characterizes the color response of the device and enables color conversion of the appearance information to another device;
    updating the appearance information with the color profile information;
    selecting parts information descriptive of the geometry of at least one part of the garment and applying the updated appearance information to provide updated parts information; and
    storing the updated parts information for reference during the manufacture.

19. The method as in claim 18, further comprising storing the updated appearance information on non-transitory media.

20. The method as in claim 18, further comprising:
    obtaining color profile information for an output device and adjusting color output of the output device to reproduce the desired appearance for the fabric.

* * * * *

UNITED STATES PATENT AND TRADEMARK OFFICE
CERTIFICATE OF CORRECTION

PATENT NO. : 9,661,885 B2
APPLICATION NO. : 14/920496
DATED : May 30, 2017
INVENTOR(S) : Harold A. Teveris It is certified that error appears in the above-identified patent and that said Letters Patent is hereby corrected as shown below:

In the Specification

Column 12, Line 1, change "the color response" to -- a color response --.

Column 12, Line 6, change "the geometry" to -- a geometry --.

Column 12, Lines 49, 50, change "the color response" to -- a color response --.

Column 12, Lines 53, 54, change "the geometry" to -- a geometry --.

Column 12, Lines 60, 61, change "the platform management tool" to -- the pattern management tool --.

Column 12, Lines 63, 64, change "the platform management tool" to -- the pattern management tool --.

Column 13, Lines 1, 2, change "the platform management tool" to -- the pattern management tool --.

Column 13, Lines 4, 5, change "the platform management tool" to -- the pattern management tool --.

Column 13, Lines 7, 8, change "the platform management tool" to -- the pattern management tool --.

Column 13, Lines 11, 12, change "the platform management tool" to -- the pattern management tool --.

Column 14, Line 1, change "the color response" to -- a color response --.

Column 14, Line 6, change "the geometry" to -- a geometry --.

Signed and Sealed this
Seventeenth Day of May, 2022

*Katherine Kelly Vidal*

Katherine Kelly Vidal
*Director of the United States Patent and Trademark Office*